Nov. 25, 1924.
E. R. FELLOWS
1,516,524
GEAR GENERATING CUTTING MACHINE
Original Filed Aug. 29, 1918   4 Sheets-Sheet 1
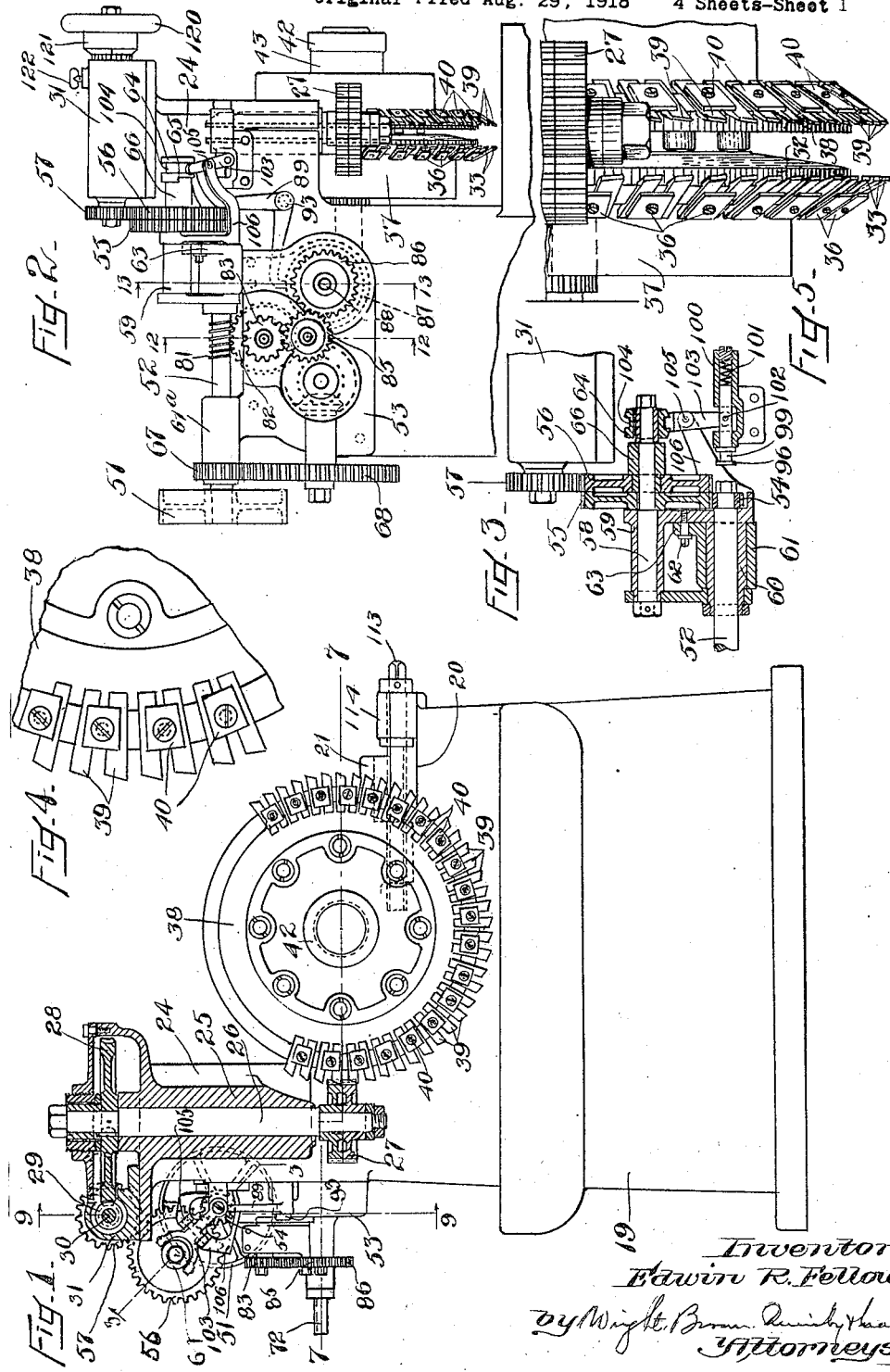
Inventor:
Edwin R. Fellows Nov. 25, 1924.  1,516,524
E. R. FELLOWS
GEAR GENERATING CUTTING MACHINE
Original Filed Aug. 29, 1918   4 Sheets-Sheet 2
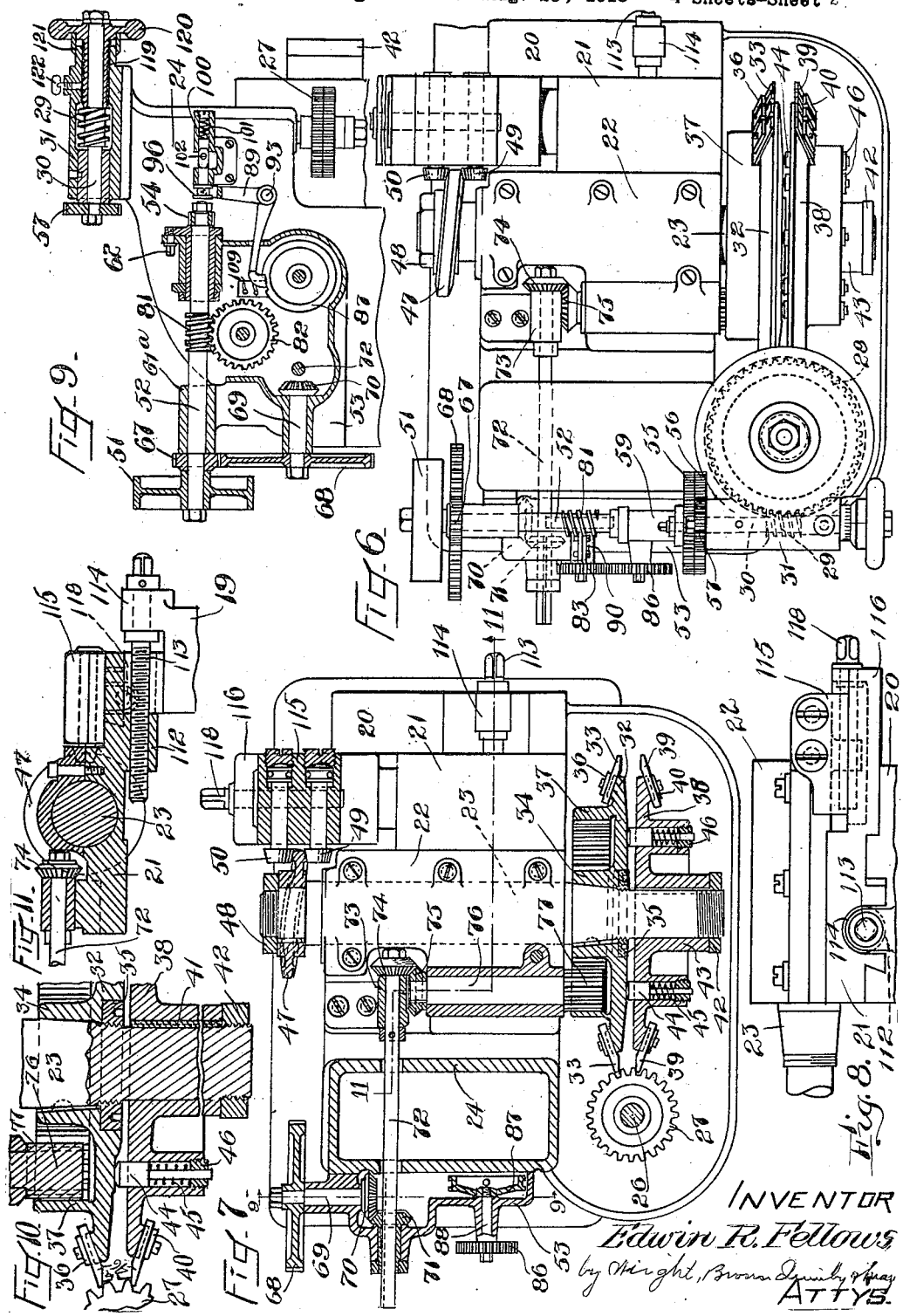
INVENTOR
Edwin R. Fellows
by Wright, Brown, Quinby & Fray
ATTYS.

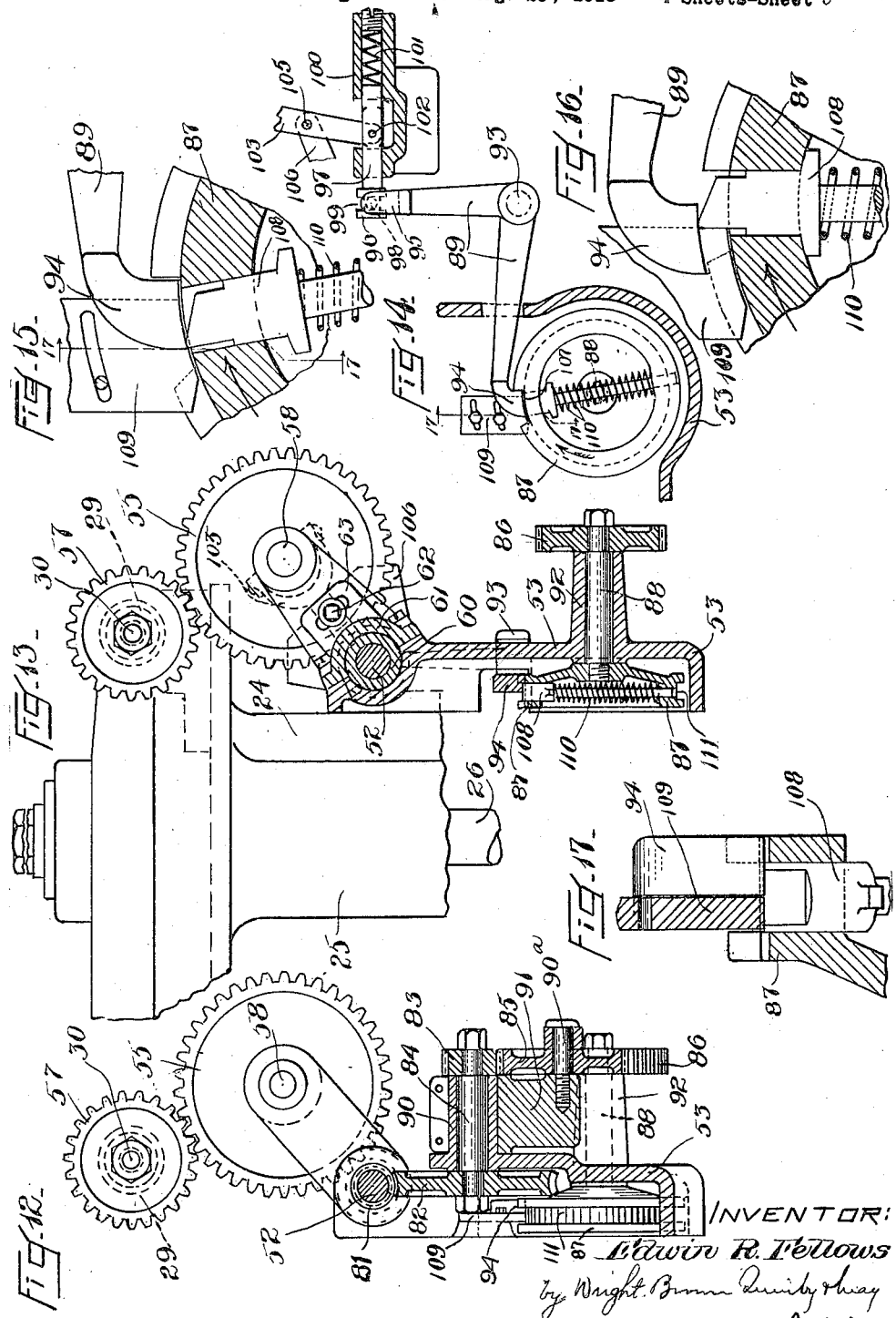

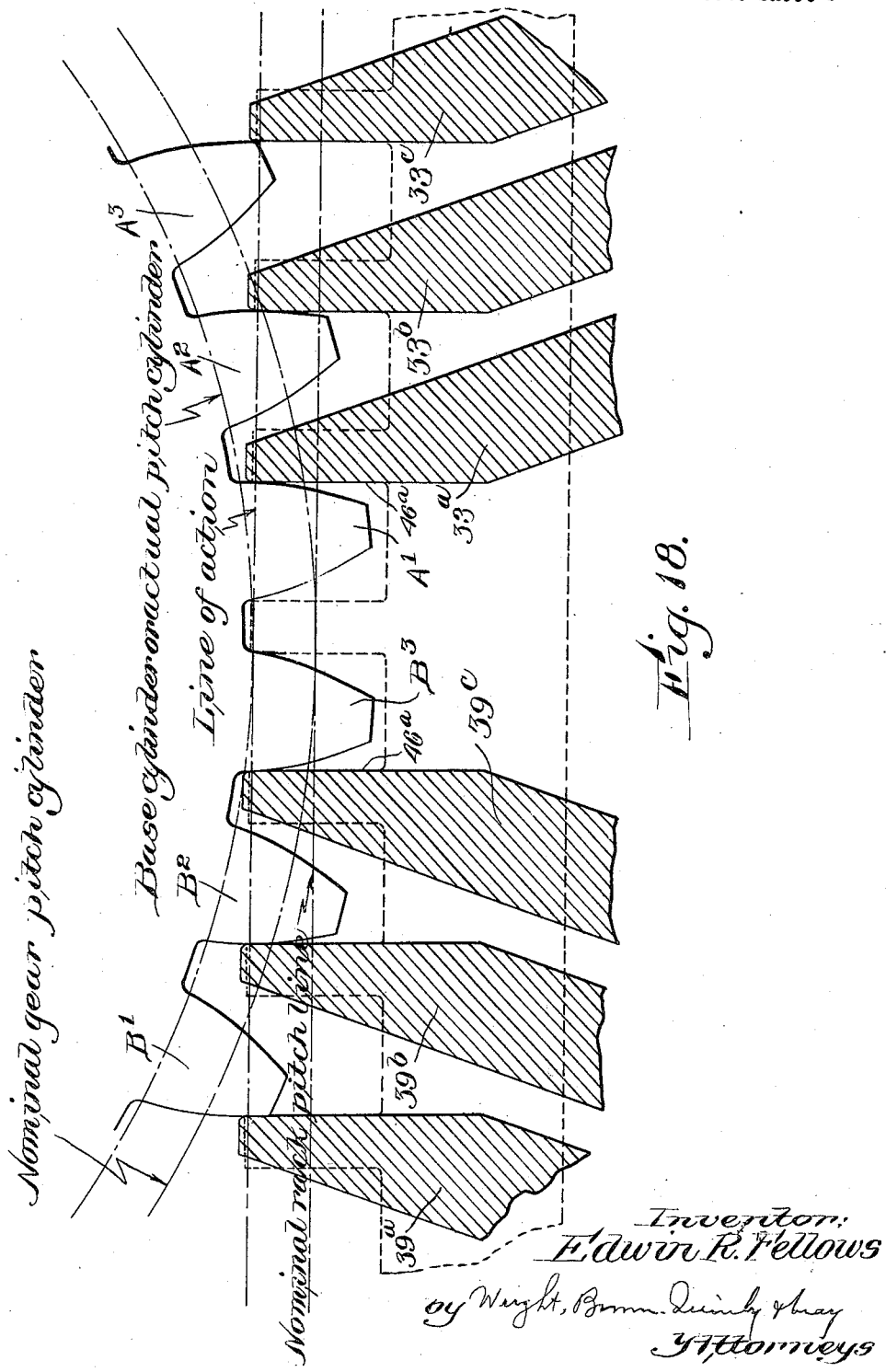

Patented Nov. 25, 1924.

1,516,524

UNITED STATES PATENT OFFICE.

EDWIN R. FELLOWS, OF SPRINGFIELD, VERMONT, ASSIGNOR TO THE FELLOWS GEAR SHAPER COMPANY, OF SPRINGFIELD, VERMONT, A CORPORATION OF VERMONT.

GEAR GENERATING CUTTING MACHINE.

Application filed August 29, 1918, Serial No. 251,902. Renewed April 19, 1924.

*To all whom it may concern:*

Be it known that I, EDWIN R. FELLOWS, a citizen of the United States, residing at Springfield, in the county of Windsor and State of Vermont, have invented new and useful Improvements in Gear Generating Cutting Machines, of which the following is a specification.

This invention relates to the art of gear cutting, and has particular reference to machines adapted to generate, by true mathematical generation, accurate involute curves in the tooth faces, at the same time with cutting the teeth, of a gear blank. The objects of the invention include the following:—first, to provide a machine constructed and organized as a whole to be rendered capable of thus generating and cutting gears of any size, any pitch, and any angle of tooth face, within the limits imposed by the size and proportions of the specific machine, by making a few adjustments of the simplest sort; second, to provide a cutting tool constructed and operated as a milling cutter of such form and so mounted that, without change, it is adapted to generate and cut involute tooth curves of all sizes, pitches, and inclinations; third, to make the cutter with a large number of blades or cutting teeth located upon part only of the circuit of a cutter head or carrier having great linear extent of periphery, whereby the cutting of a tooth face may be completed, and the work indexed, in the course of one cycle of the cutter; and, fourth, to provide in the machine two cutting tools arranged to generate and cut the opposite faces of the same gear tooth, or the relatively opposite faces of different teeth, and being adjustable as to their distance apart from one another, thus doing in the same time twice the amount of work performed by a single cutting tool, and simplifying the adjustments necessary to determine the thickness of the teeth.

The principle upon which the invention operates is that of generation by relative movement between the work piece (gear blank) and the cutting tool, equivalent to the movement of a point on an inextensible line being wound upon, or unwound from, a cylinder in accordance with the mathematical law of involute curves; and cutting by simultaneous travel of the cutting tool across the plane in which such relative movement takes place. This relative movement is the resultant of combined movements of rotation and translation, and may be produced in any of three ways, that is; first, by giving both movements to the gear, in which case the resultant motion is the same as though the gear were rolled on its base cylinder on a plane surface; second, by giving both movements to the cutter, when the resultant is the same as the motion of any point in a line being unwound from a fixed cylinder; or third by giving the movement of rotation to the gear and the motion of translation to the cutter, these movements being the same as those occurring in an intermeshing rack and pinion gearing when the rack is moved endwise and the pinion is rotated about a fixed axis. In the machine in which I have embodied the invention for illustration in the present specification, I have applied the third of the above described modes of producing the necessary relative generating motion.

Another principle of which I make use, is the familiar principle of gearing that the tooth face of a rack which meshes properly with the teeth of a gear having involute tooth curves is a plane perpendicular to the plane of action of the gear, and that the base cylinder of the gear is a cylinder coaxial with the gear tangent to such plane of action. When the relative motion between the gear and rack is such as to produce the effect of rolling the gear on its base cylinder, the tooth faces of the correctly meshing rack, according to this principle, are perpendicular to the length and pitch line of the rack; that is, in the technical language of the art, the angle of the rack is 0°. This relation holds whatever may be the pitch of the gear or the inclination of its tooth faces; wherefrom it follows that a rack tooth face of 0° angle will engage properly with an involute gear of any size, pitch, or angle of face.

By making use of the principle last set forth, and producing relative motion between the gear blank and cutting tool with the effect of base cylinder rolling motion of the gear blank upon the plane of action, I am enabled to use a cutting tool having cutting edges which, when they pass across the work, have the relation to the gear tooth of a rack tooth face of 0° angle; and thereby to mount the cutting tool for rotation about an axis parallel to the plane of action and to the direction of relative translative displacement between the gear blank and tool. In consequence I am able to employ the same cutting tool, without adjustment, for generating and cutting the teeth of gears of all sizes, all pitches, and all angles of face, within the limits of size of the specific machine; and to use at the same time two cutting tools on the same shaft, or on alined or parallel shafts, with the effect of doubling the output of the machine and determining the width of the gear teeth in a simple manner.

So far as I am aware, all gear cutting machines of the prior art have required a special cutter for each pitch and type of gear to be cut and in machines using milling cutters it has been necessary to provide special cutters for all different sizes of gear as well.

In this specification, because the actual gears cut have substantial thickness, I have called by the terms "base cylinder", "pitch cylinder", and "plane of action", the conceptions which are commonly referred to in discussions of gearing as "base circle", "pitch circle", and "line of action", respectively.

Having designed the machine here shown in accordance with the principles hereinbefore discussed, the milling cutter is provided with a straight cutting edge perpendicular to a line tangent to the base cylinder of the gear blank, and also perpendicular to the axis of its cutting rotation, and the holder for such cutter is shifted in the course of cutting a tooth of the gear in a line parallel to said "plane of action."

When the machine is designed to produce straight spur gears, as is the particular machine here shown, the axis about which the cutter rotates is also parallel to the "plane of action", and therefore parallel or coincident with the directions of this shifting movement; but in machines for producing other types of gear, such as helical and curved tooth spur gears, the relations between such axis and the plane of action, the directions of shifting movement, and the direction of the cutting edge, may be appropriately varied. In any case, however, the cutting edge is perpendicular to the so-called "plane of action", and the displacement of such edge, between its positions when in successive rotations it crosses the same plane radial to the axis, is in a direction in or parallel to said plane. It results from this essential condition that the same cutter in the same machine may be used to generate and cut involute gears of all sizes, pitches, and tooth angles, within the limits of adjustment of the machine for size, by making adjustments of the very simplest sorts and that two cutters on the same shaft can be used for cutting at the same time opposite tooth faces in straight or helical spur gears.

In the foregoing statement the cutter is considered as a single element having a single cutting edge, acting once on the gear blank in each rotation. Successful commercial practice requires that there be actually many such elements arranged to act in rapid succession, in the interest of rapid production of work; and I have therefore made the cutter with a large number of blades or cutting teeth, each having a cutting edge arranged as set forth. The principle is the same, whether there is one cutting element or many of them, and the general description hereinbefore given applies to each of the blades or cutting teeth of the entire cutting tool actually used. In the cutting tool here shown, I have made the number of blades or teeth great enough to complete the gear tooth in the course of one rotation or cycle of the cutter; and in addition, have made the peripheral extent of the cutter head or blade carrier enough greater than the extent of the series of blades to permit indexing of the work in the course of the same cycle, whereby it is unnecessary either to stop the cutter or to move it out of the way of the work for this purpose.

The foregoing relates to the main object of the invention. Secondary objects are concerned with means for indexing gears of certain characters, and various mechanical features and details, all of which can best be explained in connection with a detailed description of the embodiment of my invention here presented for illustration. In addition to the fundamental features or means first mentioned, the invention consists in these other features last referred to and pointed out in the claims.

The drawings provided with this specification illustrate a machine embodying one form of the invention, though not representing the only possible form thereof. In the drawings, Figure 1 is a front elevation, with a part broken away and shown in section, of said machine.

Figure 2 is a left hand end elevation.

Figure 3 is a sectional view on line 3—3 of Figure 1, with an adjacent part represented diagrammatically.

Figure 4 is a front elevation enlarged of a fragment of the milling cutter.

Figure 5 is an elevation enlarged of so much of the milling cutters as appear in Figure 2.

Figure 6 is a plan view of the machine.

Figure 7 is a horizontal section and plan taken on line 7—7 of Figure 1.

Figure 8 is an elevation of a fragment of the machine bed, showing certain adjusting means.

Figure 9 is a left hand end elevation and vertical section on line 9—9 of Figures 1 and 7.

Figure 10 is a horizontal section illustrating a detail of the cutter and the drive for the same.

Figure 11 is a vertical section on line 11—11 of Figure 7.

Figure 12 is a vertical section on line 12—12 of Figure 2 and an elevation of the parts at the right of said line.

Figure 13 is a section on the line 13—13 of Figure 2.

Figure 14 is a detail elevation of the indexing mechanism.

Figures 15 and 16 are fragmentary details enlarged of a part of the indexing cam showing the same in two different positions.

Figure 17 is a detail cross section on line 17—17 of Figure 14.

Figure 18 is a diagram illustrating the manner in which the cutter acts to generate the tooth curves in the gear blank.

The same reference characters indicate the same parts in all the figures.

The machine base 19 supports a bed 20, whereon is a carriage 21 having a bearing 22 in which the cutter shaft 23 is mounted to turn; and said base is also provided with a head 24 having a bearing sleeve 25 for the spindle 26 which carries the work piece 27, the latter being the gear to be cut. In the drawing two gears are shown as being cut the same time, but it is feasible to mount a single gear only on the spindle in correct position to be cut. Rigid with this spindle, being keyed thereon, is an index wheel 28, the same being made as a worm wheel which is driven by a worm 29 on a shaft 30 having bearings in the box 31 mounted on the side of the head 24.

*Generating and cutting means.*

For the purpose of giving the required relative generating movement between the cutter and gear, the latter is rotated at a determined rate of speed by the worm and index worm wheel, and the cutter is at the same time shifted bodily. The entire cutting tool is here shown as composed of a large head carrying a number of inserted blades or cutting teeth, each of the blades being a cutter complete in itself, but a sufficient number of the blades being provided on the one head to complete the side of one tooth; and the head being large enough to mount all of these cutters on a part, which is considerably less than the whole, of its circumference. This arrangement makes it possible to finish a tooth of the gear blank and return the cutter tool into position for doing work on another tooth in the course of one complete rotation of the cutter head. I also preferably provide two cutter heads on the same shaft, each having its complete set of blades or inserted cutters in order that two tooth faces may be cut at once. Preferably also the cutters of one head are the reversed duplicates of the other, whereby the one cutter tool may generate one face of a tooth of the gear, and the other cutter tool may generate the opposite face of either the same tooth or of a different tooth; and whereby also, by adjustment of the cutter heads axially, the width or size of the finished gear teeth may be determined. One cutter head is indicated 32 and the cutters carried thereby are designated 33. Such head has a hub 34 which fits on a tapered part of the cutter shaft, and is secured by a nut 35. Preferably it is also keyed to the shaft. The rim or peripheral part of this head is provided on one side with grooves in which the cutters are placed, and carries clamps 36 for securing the cutters detachably in place. The head also has an axially extending flange 37 with internal teeth, thus forming an internal gear adapted to mesh with the driving pinion later described. This is a convenient, although not essential, driving connection, and other mechanisms may be used for the purpose, if desired.

The other cutter head is designated 38 and it has a similar rim adapted to hold the cutters 39, and equipped with cutter-holding clamps 40. This cutter head is adjustable lengthwise of the shaft, and is prevented from turning thereon by a spline 41. The distance between teeth 39 and teeth 33 is determined by an adjustable collar 42, which is threaded on the shaft 23 so as to bear against the outer end of the hub 43 of cutter head 38. Instead of holding the latter cutter head rigidly between fixed or adjustable abutments, I prefer to provide spring plungers 44 which are carried by the head 38 and are arranged to press against the cutter head 32 so as to hold the hub 43 against the collar or nut 42. These plungers are mounted in guides in the cutter head 38 and are pressed upon by springs 45 which react against plugs 46; the preferred construction and arrangement of these parts being clearly shown in Figures 7 and 10. The spring plungers take up all looseness or play between the cutter heads, and make it possible to adjust the distance between the two sets of cutters accurately by the collar 42 alone.

The cutting edges of all the cutters of both sets are designated by the single numeral 46ª. These edges are arranged on such a bevel that when the cutters are properly positioned in the heads, the edges of each set are in a plane perpendicular to the axis about which they rotate in cutting.

Thus said cutting edges correspond, in their relation to the gear being cut, to the face of a rack tooth of 0° angle adapted to mesh with the gear, and when moved translatively at the same speed as the linear movement of a point on the base cylinder of the gear, (the latter being turned about its axis at the same time), such cutters are enabled to generate correct involute curves in the faces of the gear teeth, according to the mathematical law of involute curves and the principles of gearing previously herein explained. The advantage of this arrangement of the cutting edges is that the same cutters are adapted to generate teeth of any pitch and of any angle or inclination of tooth face, within the limits of the machine, and it is not necessary to substitute a cutter of special angle, form or size for gears of different pitches and different tooth angles, as is the case in all prior machines and methods used in gear cutting of which I have knowledge.

For moving the cutter axially in unison with the rotational movement of the work, I have provided a cam 47 which is keyed or otherwise mounted on the cutter shaft 23 so that it cannot turn thereon, but is removable to permit substitution of other cams of different pitch and is clamped by a nut 48. This cam is essentially a rib offset in the required manner axially of the shaft, and projecting between two abutment rolls 49, 50 which are relatively fixed in position, although adjustable for purposes presently described. This cam is so designed that it gives a gradual uniform movement of translation to the cutters from the commencement to the end of their action upon a tooth face, and after finishing a tooth, it returns the cutter to starting position.

As previously indicated, one feature of the invention for which I claim protection, although without limiting my main claims thereto, is that each cutter head is sufficiently large, and the number of cutters or blades carried thereby sufficiently great, to enable each cutting operation to be completely carried out during a part only of one rotation of the head. In the specific design here shown this partial rotation is approximately, or slightly more than, two-thirds of a rotation, and the cutter blades are therefore mounted on approximately the same proportion of the cutter head, leaving the remainder of the head without cutters so that it will clear the work on the return travel. Any other proportion between the part of the head occupied by cutters and the part which is left blank may be adopted according to the specific nature of the work being cut, limited only by the permissible steepness of that part of cam 47 which returns the cutter to starting position. The cutting instrument thus described may be briefly characterized as a tool or instrument comprising a carrier and an interrupted series of blades or teeth mounted on said carrier for travel in a closed path. A tool having such characteristics may be made otherwise than with a rigid circular cutter head as the carrier.

*Driving mechanism.*

Power for producing the motions described is applied by a belt (not shown) to a pulley 51 on a shaft 52 which is mounted in the manner presently described upon a casing 53 secured to the side of the head 24. Said shaft carries a pinion 54 (Fig. 3) which meshes with an intermediate gear 55; the latter being coaxial with, and normally connected to a gear 56 which meshes with a pinion 57 on the shaft 30, previously described as carrying the worm for driving the work. 57 is a change gear and has either the same number of teeth as the gear to be cut, or a multiple of such number of teeth. Gears 55 and 56 are of the same size and have the same number of teeth as the index worm wheel 28. They are mounted on a shaft 58 carried by a quadrant or swing frame 59 which includes in its construction a sleeve 60 surrounding and making one of the bearings of shaft 52, and fitting in a bearing box 61 (Figure 13) secured to the casing 53. Thus the gears 55 and 56 may be adjusted to accommodate the latter to change gears 57 of different sizes. In each adjustment the swing frame or quadrant is made fast by a bolt 62 passing through a flange 63 on the box 61 and threaded into one of the arms of the swing frame 59, as shown in Figures 3 and 13. A second bearing for shaft 52 is provided in $61^a$, a part of the casing 53.

Gear 55 is keyed to shaft 58, and gear 56 is loose on said shaft but is normally coupled to the shaft by a clutch 64 splined to the shaft and having a tooth or shoulder 65 (Figure 2) engaging a complemental tooth in the end of a sleeve 66 on which the gear 56 is fixed.

The shaft 52 carries also a pinion 67 (Figures 2, 6, 9) in mesh with a gear 68 on a shaft 69 (Figure 7) carrying a bevel gear 70 in mesh with a bevel gear 71 which is splined upon a shaft 72 passing through the head 24 and supported in a bearing 73 which is carried by the carriage 21 whereon the bearing 22 for the cutter shaft is mounted. The bearings for shaft 69 and for the hub or sleeve of gear 71 are structurally parts of the casing 53. A bevel gear 74 on the end of shaft 72 drives a bevel gear 75 on a shaft 76 which carries a pinion 77 in mesh with the internal gear teeth of the cutter head flange 37. The last named pinion and internal gear have wide faces to permit the axial movement of the cutters previously described. The splined connection of shaft 72 with gear 71 permits movement of said shaft endwise with adjustments of carriage 21, later described.

The rotation thus imparted to the cutters is transmitted to the shaft or spindle 23 carrying them, and thereby the cam 47, carried by said shaft, is caused to impart the feeding and return movements to the cutter as already described. Thus the cutter is moved and the blank is rotated by mechanisms deriving power from the same source and operating in unison, such mechanisms being of positive character throughout and thereby effecting exact synchronism in the movements of the cutter and work in the manner required for the purposes set forth.

The exact manner in which the cutter is arranged with respect to the gear blank and the manner in which it performs its generating function are illustrated in Figure 18. Here the cutters 33 and 39 are each illustrated in three different positions, as $33^a$, $33^b$, and $33^c$; and $39^a$, $39^b$, and $39^c$, respectively; the cutter 33 being engaged with the right hand face of a gear tooth A and cutter 39 with the left hand face of a gear tooth B. Different positions of these gear teeth corresponding to the positions of the cutter are designated $A'$, $A^2$, and $A^3$; $B'$, $B^2$, and $B^3$, respectively. The cutter 39 first engages the tooth B at the tip thereof and the position of engagement shifts along the face to a point near the root of the tooth; while the cutter 33 engages tooth A first near the root of the latter and the point of engagement shifts outward to the tip. Adjacent to the several indicated positions of the cutters are dotted line constructions representing rack teeth having faces of 0° angle, to which the cutting edges of the cutters correspond, as previously explained. The point in each cutter which finishes the gear tooth face to exact size and form is displaced in a line designated in this drawing "the line of action", which is the intersection of the plane of the drawing with the plane of action between the gear and the rack of 0° face angle, and tangent to the base cylinder of the gear. Evidently the resultant relative movement between the above specified point in each cutter and the gear blank is that which describes an involute curve, since the linear velocity of the gear base cylinder is equal to the rate of displacement in said line of the cutter. The point at which this line intersects the edge of the cutter is the cutting point which generates and finishes the tooth curve, while the cutting edge adjacent to that point and on each side thereof removes surplus stock, leaving to said point the duty only of cutting down the surface to the final form. Provided only the cutting point thus identified is displaced along the "line of action" and the gear is rotated at a rate such that the linear travel of its base cylinder is equal to the rate of displacement of the cutter in such "line of action", the desired result of correctly generating tooth curves will follow whatever may be the specific nature of the gear.

The displacement above referred to as taking place in a line tangent to the base cylinder of the gear, refers to the displacement of the cutting points of successive teeth or cutter blades when they cross such line. Actually of course the travel of each cutter is a helix, compounded of the rotation of the cutting point and the linear travel of the entire cutter tool, but the displacement or the shifting of the cutter referred to in this specification and claims is the displacement between successive positions of the same cutting point in the same line tangent to the base cylinder of the gear. Where used in the claims without other qualification, the term "displacement" and the term "shifting" as applied to the movement of the cutter other than its rotative cutting travel, are both to be construed with the meaning above indicated.

*Indexing mechanism.*

It is apparent from Figure 18 that during the cutting of one tooth face the gear is turned through an angle approximately equal to the angle subtended by three teeth. That is, from the time that the cutter 33, for example, first engages the root of a tooth at the tangent point between the base cylinder and the plane of action until it leaves the tip of the tooth in the position $33^c$, the gear has turned through the angle of three teeth and their adjacent spaces, approximately. And since the gear is rotated constantly in the same direction, not only during the cutting operation but also while the cutting tool is returning to starting position after having completed a cut, it is clear that a certain number of the gear teeth are skipped between cuts, so that each succeeding cut is made, not on the next following tooth, but on one several spaces back of the tooth last finished. The exact time of cutting a tooth, measured in terms of the angle turned through by the gear during that time, will vary with the size of the gear and the pitch of its teeth, and the time needed for returning of the cutter, measured in the same terms, may be of any value, from considerably less than the time of rotation of one tooth up to any part of the rotation of two or more teeth. The cutting travel and return travel together make the cycle of the cutter, and the return travel is designed to complete the cycle in the time of rotation of a whole number of teeth, and also in the shortest possible time. Now, if the total number of teeth of the gear being cut is the multiple of the number which pass a given point during one cycle of the cutter, the finished teeth will ultimately come into register with the cutter again and the intermediate teeth will not be cut at all. In order to prevent this result in such a case and cause all the teeth to be cut automatically, I provide an indexing mechanism which changes the relation of the gear to the cutter when the gear has completed nearly a complete rotation, or in other words, when the next tooth about to come into position to be cut is the one which was first finished. In this machine the required change in such relation is effected by causing the gear to remain stationary for a period equal to the time of rotation through the angle subtended by one tooth and the adjacent tooth space, or a multiple of that time.

This mechanism comprises a worm or screw 81 on shaft 52, a gear train consisting of a worm wheel 82 (Figures 9 and 12) in mesh with the worm 81, pinion 83 on the shaft 84 of said worm wheel, intermediate gear 85 in mesh with pinion 83, and a change gear 86 in mesh with the intermediate gear; timing disk 87 on the shaft 88 of gear 86, and a lever 89 controlled by said timing disk and effective to throw clutch 64 into and out of gear. Shaft 84 above mentioned is mounted in a bearing sleeve 90 projecting from the casing 53, and gear 85 is mounted on a stud 90ª carried by a holder 91 clamped upon said sleeve and adapted to be turned about the same. The shaft 88 is mounted in a bearing sleeve 92, which also projects from the casing 53. Lever 89 (Figures 2, 9, and 14) is a bell crank pivoted on a stud 93 and provided with a foot 94 on one arm, which rests on the rim of the disk 87. The second arm of the lever carries a fork 95 which embraces a head 96 on a plunger 97, and carries studs 98 projecting into a groove 99 in said head, making a coupling of well known character. Plunger 97 is mounted so that it may move endwise in a guide 100 and is pressed upon by a spring 101, thereby exerting force on the lever so as to press foot 94 against the rim of the cam. To the plunger 97 is connected by a pivot 102, a lever 103 having a fork which embraces the clutch 64 and carries pins entering a groove 104 in the latter. This lever has its fulcrum on a pin 105 mounted in arms 106 which project from the quadrant 59 (Fig. 2), previously described as carrying the shaft 58 and gears 55, 56. Clutch 64 is normally held engaged with the sleeve or hub 66 of gear 56 by the rim of the timing disk 87 acting through lever 88, plunger 97 and lever 103. In the rim of the disk is a notch 107 which, when it arrives under the foot 94, allows the latter to drop, and permits the spring 101 to throw clutch 65 out of mesh by swinging lever 103, thus disconnecting gear 56 from shaft 58 and interrupting the driving train to the work piece, which then stands still.

The value of the gear train from shaft 52 to timing disk 87 is such that the timing disk turns at the same angular velocity as the gear blank. After said disk has caused disconnection of the clutch in the manner described, it restores the clutch into the coupled position so that the gear train to the work piece is completed, and the latter again set in motion when the shaft 58 has made a complete rotation. Since the gears 55 and 56 have the same number of teeth as the index wheel 28, and gear 57 the same number of teeth as the work piece, it is evident that one revolution of the gear 55 turns the work piece through the angle subtended by one tooth, when the worm 29 driving the index wheel has a single thread whereof the pitch is equal to the pitch of the index wheel, and that stopping gear 56 while gear 55 makes a complete turn causes the work piece to stand still for the time required to turn it through the same angle. For some classes of work it may be necessary to provide a change gear 57 having a multiple of the number of teeth of the work piece, or the work may be required to stand still for the time of rotating through the angle of two teeth. In either case the clutch would need to remain uncoupled while the gear 55 makes two or more turns, and the means which I have provided and will now describe for coupling the clutch takes care of this condition.

As the disk 87 turns at a relatively very slow speed, some other means than a cam surface must be provided to return the lever 89 to the position for coupling the clutch. The shoulder at the advancing side of the notch 107 may be made radial to the cam, or undercut if necessary; thus permitting as rapid movement of lever 89 as may be necessary to uncouple the clutch, but no inclined surface as a part of the disk could be designed to again couple the clutch within the time available. Hence, for the purpose of returning said lever with sufficient speed, I have provided an ejector in the form of a plunger 108 which is carried by the disk, and a co-acting retractor or stop 109 for the plunger. Said plunger extends through an opening in the rim of the disk and is pressed upon by a spring 110 so that its end is constantly urged radially outward. The stop 109 is fixedly mounted on the side of the machine frame over an encircling groove 111 in the perimeter of the disk, and its end projects into such groove. The foot 94, however, rests on a flange at one side of this groove. The end of the plunger crosses the notch 107, and the stop 109 is close to the lever foot 94, the arrangement being such that when the foot enters the notch, the plunger has already been pushed back by the stop. As the disk continues to rotate, the rear edge of the plunger is carried past the stop, and as soon as it is clear thereof, the plunger is suddenly shot outward by its spring, thereby instantaneously moving lever 89 and shifting the clutch into coupling position. The stop 109 is made adjustable backward and forward in the general direction of rotation of the adjacent part of the disk, whereby the time elapsing between the passing of foot 94 into the notch and release of the plunger may be regulated as desired. Of course the plunger is so formed and proportioned as to move suddenly in the manner described, and to permit of the adjustment described. By thus adjusting the stop it is possible to hold the clutch out of action for one, two, or more rotations of the shaft 58.

The need of providing the additional lever 103 in the clutch operating connections, instead of operating the clutch directly by lever 89 arises from the necessity of mounting the gear 56 to swing into engagement with change gears 57 of different diameters, the result of which is that the clutch is placed in different planes, while the disk and lever 89 remain in the same plane. To all intents and purposes, however, the lever 89 is the clutch shifter in spite of the fact that it accomplishes this office indirectly instead of by direct engagement with the clutch. Plunger 97, with lever 103, make a form of universal joint between such clutch shifter and the clutch. The plunger is the pivot of this universal joint and is in alinement with shaft 52.

While Figure 18 shows the time of cutting the gear tooth to be nearly the time of rotation of the gear through the angle of three teeth, the condition there shown is not the one most commonly met in practice; for with gears of the sizes and pitches more generally used, the cutting operation will be completed in approximately the rotation through the angle of two teeth, and the entire cycle of movements of the cutter will occur while the gear turns through the angle of three teeth. Therefore, the particular machine shown in these drawings has been designed to cut every third tooth of the gear, and to index the gear by stopping its rotation for the time of turning through the angle of one tooth when the $n\text{-}2^{nd}$ tooth has been cut, ($n$ being the number of teeth of the gear, and being a multiple of three). The effect of the indexing thus described is to cause the cut which takes place following the indexing to be made on the second tooth following the one last cut instead of the third tooth; or more broadly stated, is to cause the number of teeth intervening between successive cuts to be different from the number which would intervene if the gear were allowed to turn uninterruptedly. All the teeth are then cut while the gear makes three rotations, or in general terms, rotates a number of times equal to the number of teeth between successive cuts.

Where the number of teeth in the gear being cut is not a multiple of three, having regard to the machine here shown, or to state the same proposition in general terms when the number of teeth comprised between successive cuts is not a divisor of the number of teeth of the gear, the indexing device is unnecessary and may be dispensed with, the controlling disk being then made inoperative by disengaging gear 85 from the change gear 86.

As the cutter tool makes a complete rotation in the course of each cycle, the part of its periphery occupied by cutting blades bears approximately the same ratio to the unoccupied part as the ratio of the time of cutting travel to the time of the return travel.

*Adjustments.*

Substitution of gears of different values for the change gears 57 and 86 enables the work piece and disk to be rotated at such different angular velocities that gear blanks of different pitches and diameters, and different tooth angles, may be cut, since by that means a gear blank of any diameter, capable of being placed in the machine, may be rotated at any desired angular velocity to give it the same linear motion on the base cylinder (whatever the diameter of such base cylinder may be), as the displacement travel of the cutters.

The controlling cam 47 must be made special for each pitch, and that part of it which displaces the cutters in their cutting travel is made as a helix of pitch such that the linear displacement of the cutters is equal in extent and speed to the linear movement of the gear blank base cylinder. Otherwise the proportions of the cam are so designed that the part which returns the cutters may serve the intended purpose without shock and without applying an excessive thrust on the rear abutment roll 50. As the cam is mounted on the exposed rear end of the cutter spindle and secured by a nut, it may be removed and another substituted as readily as an exchange of changeable gears may be made. While the complete equipment of a commercial universal machine requires cams capable of giving two-, three-, and four-tooth feeds to the cutters for each pitch of gear, certain cams may perform double duty, since a two-tooth feed cam for a four pitch gear is the same as a four-tooth feed cam for an eight pitch gear, and so forth.

The cutters may be adjusted to gears of different diameters by moving the carriage 21 on the bed 20, such carriage having for this purpose a bored and threaded lug 112 meshing with a screw 113 which has its bearing in a bracket 114 on the base; such screw extending transverse to the line of travel of the cutters.

Longitudinal adjustment of the cutter spindle is made possible by mounting the rolls 49, 50 which confine the cam 47 of the cutter spindle, in a slide 115 fitting a guide 116 on the cutter carriage, and by providing a screw 118 on the cutter carriage to engage a threaded part of said slide (see Figs. 7, 8, and 11). Said rolls 49 and 50 are mounted on studs which occupy passages in the slide 115, in which they are movable endwise. Screw abutments at the end of said rods serve to adjust them to take up lost motion between the cam and rolls, which are complementally beveled for that purpose.

The gear blank teeth may be adjusted to the generating wheel by shifting the worm 29 endwise. The bearing for one end of the worm shaft is a sleeve 119 (Figure 9) threaded into the worm box 31, and provided with an adjusting hand wheel 120, such sleeve and the shaft and worm being formed and proportioned to prevent end shake of the latter. A cover sleeve 121 secured to the hand wheel surrounds the adjacent part of the worm box and is graduated so as to measure, with reference to index marks on the worm box, the exact extent of adjustment. A set screw 122 secures the adjustments of the bearing sleeve.

Thus it will be seen that any adjustment involves at most only the changing of two changeable gears and a cam, and the turning of three adjusting screws. No other change is required, and in particular there is no necessity for substituting a different cutter; and as a corollary it is not necessary to provide a large number of different cutters for completely equipping the machine, as is the case with gear cutting and generating machines of the types previously known. Although in the construction here shown there are many cutting blades or elements, these elements are all alike, and they do not require to be substituted or altered except as they become worn or damaged. A machine embodying the principles herein explained in which the cutting tools are formed with fixed cutting elements or teeth instead of the detachable blades here shown is within the protection of my claims.

Various modifications in the construction and arrangement of the several parts of the machine will readily occur to any one skilled in the art. All forms of gear may be generated and cut by milling cutters having a straight cutting edge or a series of such edges perpendicular to the plane of action of the gear, where such cutting edges are so mounted as to travel in a path corresponding to the longitudinal elements in the face of the tooth to be cut.

It is also within the purview of my invention to arrange the cutter elements or blades 33 or 39 of the cutter tools in appropriate specifically different manners for cutting straight spur teeth without axial displacement of the cutter head; or for cutting other types of gears, such as those having curved teeth. In every embodiment of the invention, however, the essential relation of the cutting edge perpendicular to the line of action of the gear when in the cutting position, and being displaced so that the successive positions of the cutting point or points on the work are displaced in this line of action, persists, whereby the fundamental object of enabling teeth of all characters to be cut in the manner described is attainable in all cases.

The machine above described is particularly intended to be used for accurately finishing gears which have previously been roughed out by other methods, and it is used in cases where a high degree of accuracy is needed but it is not necessary to harden and grind the gears; although, of course its scope of usefulness is not necessarily thus limited.

In the operation of this machine the gear blank to be cut or finished is mounted on the spindle 26 and the cutter is adjusted to bring the tips of its teeth up to the line of action; the proper changeable gears having first been placed in the location of the gears 57 and 86 according to the character of the gear to be finished. Then the machine is started and simultaneously the cutter revolves and is shifted bodily in its line of travel, and the gear blank slowly rotates with a linear speed at its base cylinder equal to the rate of displacement travel of the cutter. During the forward displacement of the cutter the entire series of teeth or blades on the two cutter heads sweep across the opposite faces of two teeth of the gear blank, cutting such tooth faces to the final finished size and involute form. When the blank spaces of the cutter heads arrive opposite the gear blank the cutter carriage is withdrawn, and the cycle is repeated, the gear blank meanwhile being constantly rotated in the same direction and at the same speed. The same action continues without interruption until the entire gear is finished, in the case where the number of teeth on the gear blank intervening between successive cuts is not a divisor of the whole number of its teeth. In the other case, the indexing mechanism goes into operation from time to time to arrest the rotation of the gear blank for a time equal to that required for a given number of teeth of the gear blank to travel past a given point.

In the machine as illustrated and described no provision is made for travel during the cutting operation of the work piece in the direction of its axis, or for any equivalent displacement of the cutter in this direction. No such displacement is necessary in any case where the length of the gear in the axial direction is so small in proportion to the radius of the cutter that the deviation of the line in which the end of the cutter tooth travels from the straight line parallel to the axis of the gear, within the length of the gear tooth, is no greater than the clearance provided in the gear tooth space. That is, all gears have clearance spaces between their teeth within their base circles, as is shown in Figure 18 of the drawings, and such spaces may be made deep enough to permit travel of the extremity of such a cutter tooth as here described, when the path of such extremity extends as far as the base circle at the ends of the gear blank teeth, within the practicable limits of diameter of the cutter provided to cut gears of ordinary lengths.

What I claim and desire to secure by Letters Patent is:

1. A gear generating cutting machine comprising a rotatable milling cutter having a cutting edge of which the cutting travel takes place around the axis of the cutter, in a plane perpendicular to such axis, a gear blank holder arranged and adapted with respect to said cutter to support a gear blank with the base cylinder thereof tangent to a straight line which crosses the path of said cutting edge and is perpendicular to the plane of such path, and means for producing a continuing movement of relative translation on the part of the cutter and rotation on the part of the gear blank which is equivalent to the resultant motion of a point on an inextensible line being wound upon or unwound from the circumference of a circle.

2. A gear generating cutting machine comprising a rotating milling cutter having a straight cutting edge, the relation of which to the tooth to be generated is that of a rack tooth of 0° angle, means for holding a gear blank with the base cylinder thereof tangent to a line which is at the same time perpendicular to said cutting edge and to the direction of cutting movement thereof, and means for producing relative shifting movements between the gear and cutter equivalent to those movements resulting from rolling the gear blank on its base cylinder along such line.

3. A gear generating cutting machine comprising a rotating milling cutter having a straight cutting edge, means for holding a gear blank with the base cylinder thereof tangent to a line which is at the same time perpendicular to said cutting edge and to the direction of cutting movement thereof, means for rotating the gear blank, and means for shifting the cutter lengthwise of such line at a speed equal to the linear velocity of said base cylinder and in the direction of travel of that part of the base cylinder which is tangent to said line.

4. A gear generating cutting machine comprising a gear blank holder, means for rotating a gear blank to be cut which is mounted on said holder, a cutter tool rotatably mounted and comprising a number of cutting elements each having a cutting edge which is brought during the rotation of the tool to intersect a line tangent to the base cylinder of the gear blank, each edge at the time of intersection with such line being perpendicular thereto, and provisions for causing the successive cutting edges when crossing such line to be displaced in the direction of linear travel of the tangent point of the gear blank base cylinder by distances equal to the linear travel of said base cylinder in the intervals between the arrivals of successive cutting edges in the positions set forth.

5. A gear generating and cutting machine comprising a rotatably mounted milling cutter having a cutting edge in a plane perpendicular to the axis about which it rotates and means for mounting a gear blank to be cut with the base cylinder thereof tangent to a line which is parallel to said axis and is also within the path of the extremity of said cutting edge, and means for producing such a combination of relative rotative and translative movements between said gear blank and cutter as to cause the point of intersection between said line and said plane to describe an involute curve relative to the base cylinder of the gear blank.

6. A machine as claimed in claim 1 distinguished by adjustable driving and positioning means for changing the relative motion between the gear blank and cutter whereby to generate the curves of gear teeth of different pitches, sizes, and inclinations of face.

7. A gear generating cutting machine comprising a rotatable gear blank holder, means for giving the same and a gear blank mounted thereon a slow rotation about the axis of the blank, a milling cutter having a succession of cutting points mounted to rotate in a path perpendicular to and intersecting a line which is tangent to the base cylinder of the gear, and means for shifting said cutter bodily in a path extending in the same direction as said line, whereby the cutting points when coming into action on the blank are always in said line, said shifting means being organized to displace the cutter at a speed equal to the linear travel of the gear blank base cylinder and in the same direction as the tangent point of said cylinder.

8. A machine as set forth in claim 7 distinguished by positive driving gear trains from a common source of power effecting the rotating movement of the gear blank and the shifting movement of the cutter in exact synchronism.

9. A gear generating cutting machine comprising a driver, a rotatable holder for the gear blank to be cut, a positive gear train from said driver to said holder for rotating the blank, a rotatable milling cutter having a cutting edge arranged to travel in a path which crosses, perpendicular to, a line tangent to the base cylinder of the gear blank, which line is in a plane perpendicular to the axis of the gear blank and between the opposite faces of the blank, said cutter being shiftable bodily parallel to said line, and positive gearing from the aforesaid driver constructed and arranged to so shift said cutter in unison with rotational movement of the gear.

10. In a gear cutting generating machine the combination with means for supporting and rotating a gear blank, a milling cutter having a series of blades or cutting teeth with cutting edges all traveling in the same circuit, and means for shifting said cutter simultaneously with the rotational movement of the blank, a distance sufficient to generate the face of one tooth thereof, and then returning the cutter to starting position, the series of said cutting elements being interrupted to permit such return without interference with the blank.

11. In a gear generating and cutting machine the combination with a rotatable holder for the gear to be cut, an index worm wheel attached to said holder, a driving worm for said wheel, a rotatable milling cutter having a straight cutting edge, a rectilinearly movable carriage holding said cutter, a cam mounted on the cutter spindle constructed to cause endwise shifting of the latter and of the cutter, and a stationary abutment coacting with said cam.

12. In a gear cutting generating machine the combination with means for supporting and rotating a gear blank, a milling cutter, means for displacing said cutter simultaneously with the rotation of the gear to generate the tooth curves of the gear, said means being effective also for returning the cutter to starting position after completion of a cut, and means for temporarily intermitting the rotation of the gear blank during return of the cutter, which intermission indexes said blank.

13. In a gear generating and cutting machine the combination with a milling cutter and a holder for the same, of a gear blank holder arranged to support a gear blank with its rim crossing the line of action of said cutter, means for continuously rotating said gear blank holder, means for simultaneously shifting said cutter in the same direction and at the same speed as the linear movement of the adjacent point of the gear blank, and means for temporarily discontinuing the rotation of the gear blank holder, while the cutter is being shifted, for a time long enough to index the gear blank with respect to the cutter.

14. In a gear generating and cutting machine the combination with a cutter instrument and a holder for the same movable in a straight line, a rotatable gear blank holder arranged to support a gear blank with the base cylinder thereof tangent to the line in which the generating point in said cutter is displaced by such movement of the holder, means for moving said cutter holder back and forth, means for continuously rotating the gear blank holder at a rate which causes the linear velocity of the gear blank base cylinder to be equal to the velocity of displacement of the cutter in its cutting travel and means for stopping the rotation of the gear blank holder from time to time for a period long enough to cause indexing of the gear blank relatively to the cutter.

15. A gear generating and cutting machine comprising a rotatable holder for the gear to be cut, an index wheel on said holder for rotating the same, gearing for driving said index wheel, a translatively movable rotary cutter, means for shifting said cutter in unison with the rotation of the gear while cutting, and back to starting position, and means for temporarily disconnecting the driving gearing of said index wheel in one of the return movements of the cutter, whereby to index the gear relatively to the cutter.

16. In a gear generating cutting machine, a gear blank holder, a driving gear train for rotating said holder and the blank carried thereby, said train including a loose gear wheel and a disconnectible clutch for imparting motion to the latter, a cutter, means for shifting said cutter in unison with the rotation of the blank, and back to starting position, and a controller for causing disconnection of said clutch in the course of certain predetermined return movements of the cutter.

17. In a gear cutting machine a gear blank holder, a gear train including a worm and wheel drive for rotating said holder at a slow speed, and including also a transmission gear wheel, a driving element with which said gear wheel is loosely engaged and a disconnectible clutch between said driving element and gear wheel, a cutter arranged to act on a gear blank carried by said holder and being movable translatively in unison with the blank and back to starting position, and a clutch-controlling means arranged to cause disconnection of said clutch once in the course of a complete rotation of the gear holder for a time equal to that required for a whole number of teeth of the gear blank to pass a given point.

18. A cutting machine as claimed in claim 17 in which the clutch controlling means comprises a clutch shifter, a timing member constructed to cause operation of said clutch shifter at a given point and means for driving said timing member at a rate in given proportion to the rate of rotation of the gear blank holder.

19. A gear cutting machine as claimed in claim 17 in which the clutch controller means comprises a clutch shifter, a rotatable timing disk on which said clutch shifter bears and having a notch into which the bearing part of the clutch shifter may enter in uncoupling the clutch, means for driving said disk at the same speed as the gear blank, and a relatively movable ejector carried by the disk arranged and controlled to displace the bearing part of said clutch shifter suddenly from said notch.

20. A gear cutting machine as claimed in claim 17 distinguished by the clutch controlling disk having a notch, by a plunger carried by the disk and adapted to pass from the bottom of said notch outwardly, and by means for causing retraction of the plunger to permit entrance of the clutch shifter into the notch, and subsequent sudden outward movement of the ejector to expel said bearing portion.

21. In a cutting machine according to claim 17, a disk having a notch in its periphery, a plunger guided in the disk to be movable from the bottom of said notch toward the mouth thereof, a spring acting on said plunger tending to project the same in the direction indicated, and a retractor located in position to bear upon said plunger so as to retract the same during rotation of the disk, said retractor having a terminal shaped to permit sudden projection of the plunger when the latter has passed clear thereof.

22. A cutting machine as set forth in claim 17 having a rotatably mounted disk provided with a notch in its periphery and a circumferential groove crossing said notch, a plunger carried by the disk located at the intersection of said groove and notch, a spring acting on said plunger tending to shift the same from the bottom of the notch toward the mouth thereof, and a stationary retractor extending into said groove, whereby it engages and pushes back the plunger during the rotation of the disk, and permits the plunger to move outward after the same has passed the retractor.

23. A gear cutting machine comprising a gear blank holder, means for rotating the same, a cutter having blades movable in a closed circuit for cutting, said cutter being also shiftable in unison with the gear blank for generating the tooth curves, means for simultaneously rotating said gear blank and shifting said cutter back and forth, said cutter being provided with a blank portion arranged to come adjacent to the blank during the return movements of the cutter.

24. A gear generating and cutting machine comprising means for holding and rotating the gear to be cut, a rotatably mounted milling cutter having a series of cutting blades arranged to act in succession upon a tooth of the blank, means for shifting said cutter in unison with the gear tooth on which it acts, and for returning it to starting position, there being a space between the beginning and ending of the series of blades which space is brought beside the gear blank during the return movement of the cutter.

25. In a gear cutting and generating machine a milling cutter mounted for rotation and also for displacement, means for moving said cutter back and forth in said line and simultaneously rotating it through a complete rotation in the time of the cycle of its displacement movements, the cutter having a series of blades occupying a part of its periphery, the remainder of such periphery being blank, the ratio of the part occupied by said blades to the blank part being approximately equal to the ratio of the time of displacement of the cutter in one direction to the time of such displacement in the opposite direction.

26. In a gear generating cutting machine a rotatably mounted milling cutter, a holder for the same movable back and forth in a given line, a cam engaged with said holder and constructed for so moving it, means for rotating the cutter completely in the time required for the complete cycle of back and forth movements of said holder, said cutter comprising a series of blades occupying a part of the circuit in which said cutter rotates of which the ratio to the whole circuit is approximately equal to the ratio of that part of the cam which displaces the holder in one direction is to the entire cam.

27. The combination with a gear blank holder rotatably mounted and adapted to carry a gear blank, of a cutter having a series of blades movably mounted to carry said blades in cutting across the face of a gear blank so held, means for rotating said gear blank holder, means for shifting said cutter parallel to a line tangent to the base cylinder of the gear blank at the same speed as the linear travel of such base cylinder during the cutting action, and for returning the cutter to starting position upon completing the face of a tooth of said blank, said blades being arranged in a series of such extent that the entire series crosses the face of the gear in the time of cutting one tooth, there being a space between the beginning and ending of such series permitting return of the cutter without interference with the gear blank.

28. A gear generating and cutting machine comprising means for supporting and continuously rotating a gear blank, a plurality of rotatable cutting tools spaced apart to admit a tooth of the gear blank between them and disposed with their cutting edges parallel to one another to generate respectively opposite tooth faces, and means for shifting said cutters bodily and parallel to their rotational axes in unison with the movement of the parts of the gear blank whereon they respectively act.

29. A gear cutting machine as claimed in claim 28 in which the cutters are relatively adjustable to regulate the width of the included space between their respective cutting portions.

30. A machine as claimed in claim 28 in which said cutters include a cutter head fixed upon a spindle or shaft, a second cutter head keyed upon said spindle with provision for movement axially, a resilient thrusting device carried by the the latter head and bearing against the former head, and an adjustable abutment on the spindle against which the latter head is pressed by said thrusting means.

31. A gear generating machine, as set forth in claim 28, in which the said cutters comprise one cutter head fixed upon a spindle or shaft, a second cutter head engaged with said spindle in a manner permitting axial movement but preventing relative rotating movement, an abutment on the spindle at the side of the second cutter head more remote from the first cutter head, plungers carried by one of said cutter heads projecting and movable toward the other head, and springs arranged to press said plungers against said other head.

32. A gear generating and cutting machine comprising a holder rotatably mounted and adapted to carry a gear blank, a cutter spindle, two milling cutters mounted on said spindle and spaced adjustably to cut simultaneously tooth faces on opposite sides of an interposed part of the gear blank, means for imparting cutting rotation to said cutters, means for rotating the gear blank, and means for shifting said cutters bodily at a rate of speed equal to the linear velocity of the base cylinder and in directions such that their generating points are displaced in a line tangent to said base cylinder.

33. A gear generating and cutting machine comprising means for supporting and rotating a gear blank, a pair of milling cutters having generating cutting edges mounted to travel across the face of the gear and being perpendicular to a plane tangent to the base cylinder of the gear, and means for displacing said cutter bodily in said plane at a rate of speed equal to the linear velocity of said base cylinder, said cutters being arranged to cut tooth faces on opposite sides of an interposed part of the gear and traveling in paths which are equally distant from one another at all points.

34. A gear generating and cutting machine comprising means for supporting and rotating a gear blank, two coaxially mounted milling cutters with straight cutting edges mounted to travel across the rim of the gear blank and, when so traveling, being perpendicular to a plane tangent to the base cylinder of the gear blank, means for shifting the cutters bodily in such plane and means for causing the linear movement of the base cylinder of the gear to be equal to said displacement.

35. A gear cutting and generating machine comprising a cutter spindle, two cutter heads mounted on the same spindle and having blades with cutting edges perpendicular to the axis of said spindle, means for supporting a gear blank with its rim crossing the paths of said blades at right angles thereto, the blades being disposed to cut opposite tooth faces of the gear blank and being adjustable together and apart to determine the width of the teeth bounded by such faces, means for shifting said spindle and cutters axially, and means for rotating the gear blank at a rate such that the linear velocity of its base cylinder is equal to the velocity of such displacement.

36. In a gear generating and cutting machine, a cutter spindle, a bearing for the same in which said spindle is movable rotatably and endwise, a cutter head mounted on the spindle having a toothed flange, and a driving pinion meshing with said flange for rotating the latter, said flange and pinion being arranged at their meshing parts parallel with the shaft and having a width of face sufficient to permit the described endwise movement of the shaft.

37. A gear generating and cutting machine comprising in combination with a rotatable holder for the gear blank, a cutter carriage, a cutter spindle mounted rotatably on said carriage, a milling cutter on said spindle in position to act upon the gear blank, a cam fixed to the cutter spindle and having an axially offset rib, roller abutments between which said rib projects and by the reaction of which against the rib in the course of rotation of the latter the cutter and spindle are moved back and forth, and means for shifting said abutments in substantially the directions of said movement of the spindle, to adjust the cutter for the location of cut in the gear blank.

38. In a gear cutting machine a cutter carriage, a cutter spindle mounted on said carriage to rotate and with provision for moving endwise, means for adjusting said carriage transversely to said spindle, a cutter tool mounted on said spindle, and means for driving the tool comprising a gear element connected therewith, a pinion meshing with said element, the interengaging teeth of the pinion and gear element being substantially parallel to the spindle, a shaft extending in substantially the same direction as the line of transverse movement of the cutter carriage, gearing transmitting movement from said shaft to said pinion, and a driver having splined engagement with said shaft and mounted on a relatively immovable part of the machine.

39. An adjustable gear generating and cutting machine comprising a rotatable spindle for holding the gear blank to be cut, an index worm wheel mounted on said spindle, a worm meshing with said wheel, a changeable gear connected with said worm, a driving gear train including a transmission gear adapted to mesh with said changeable gear and a holder therefor movable to place said gear into mesh with substitute changeable gears of different sizes, a milling cutter having a cutting edge arranged to travel in a path which intersects a plane perpendicular to the axis, and located between the faces, of the gear blank, means for shifting the generating point of said cutter in a path tangent to the base cylinder of the gear blank and at the same linear speed as such base circle, a carriage on which said cutter has its before mentioned movements, and means for displacing said carriage to adjust the cutter toward and away from the axis of the gear blank holder to accommodate gear blanks of different diameters.

40. In a gear cutting machine a rotatable spindle for holding the gear blank to be cut, an index worm wheel for rotating the blank mounted on said spindle, a worm meshing with said index wheel and having a shaft, means for driving said shaft, a bearing for the shaft in which the latter is held with prevention of end shake, and means for adjusting said bearing endwise to set the gear blank into exact position.

41. A gear cutting machine as set forth in claim 40 in which a box or housing is provided for said worm and said bearing has threaded engagement in said housing whereby it may be adjusted by being rotated.

42. In a gear cutting machine in combination with a rotatable spindle carrying the blank to be cut, a combined driving and indexing means for said spindle, a worm wheel on said spindle, a worm meshing with said wheel, a pinion connected to said worm, a gear meshing with said pinion, a shaft on which said gear is loosely mounted, a clutch for disengageably connecting said gear to said shaft, a clutch shifter, a timing member controlling said clutch shifter to cause disengagement and re-engagement of the clutch, and synchronized driving means for rotating said shaft and said timing member.

43. A gear cutting machine according to claim 42 distinguished by the fact that said timing member is rotated at the same speed as the index wheel, whereby indexing of the blank is accomplished at each revolution of the latter.

In testimony whereof I have affixed my signature.

EDWIN R. FELLOWS.